US010626909B2

(12) United States Patent
Huang

(10) Patent No.: US 10,626,909 B2
(45) Date of Patent: Apr. 21, 2020

(54) COUNTERSINKING SCREW CAPABLE OF EASILY DRILLING HOLES AND DREGS REMOVING

(71) Applicant: Shu-Chin Huang, Taichung (TW)

(72) Inventor: Shu-Chin Huang, Taichung (TW)

(*) Notice: Subject to any disclaimer, the term of this patent is extended or adjusted under 35 U.S.C. 154(b) by 51 days.

(21) Appl. No.: 15/969,764

(22) Filed: May 2, 2018

(65) Prior Publication Data
US 2018/0245620 A1     Aug. 30, 2018

Related U.S. Application Data

(63) Continuation-in-part of application No. 14/014,335, filed on Aug. 29, 2013, now abandoned.

(51) Int. Cl.
| F16B 35/06 | (2006.01) |
| F16B 25/10 | (2006.01) |
| F16B 25/00 | (2006.01) |

(52) U.S. Cl.
CPC ........ F16B 35/065 (2013.01); F16B 25/0057 (2013.01); F16B 25/0015 (2013.01); F16B 25/103 (2013.01)

(58) Field of Classification Search
CPC ... F16B 35/065; F16B 21/0015; F16B 37/068
USPC .......................................... 411/399, 187, 188
See application file for complete search history.

(56) References Cited

U.S. PATENT DOCUMENTS

| 378,857 | A | * | 2/1888 | Woodford | F16B 35/06 411/396 |
| 429,241 | A | * | 6/1890 | Julian et al. | F16B 35/06 411/399 |
| 2,982,166 | A | * | 5/1961 | Hobbs | F16B 35/06 411/399 |
| 5,249,882 | A | * | 10/1993 | Nagoshi | F16B 35/065 411/386 |
| 5,772,376 | A | * | 6/1998 | Konig | F16B 35/065 411/188 |
| 6,394,725 | B1 | * | 5/2002 | Dicke | F16B 35/065 411/188 |
| 7,293,947 | B2 | * | 11/2007 | Craven | F16B 35/048 411/387.2 |
| 10,054,148 | B2 | * | 8/2018 | Lin | F16B 35/065 |
| 2007/0071576 | A1 | * | 3/2007 | Romano | F16B 33/02 411/399 |
| 2007/0224020 | A1 | * | 9/2007 | Hsieh | F16B 33/008 411/399 |
| 2011/0164944 | A1 | * | 7/2011 | Hughes | F16B 25/106 411/393 |

* cited by examiner

*Primary Examiner* — Flemming Saether

(57) ABSTRACT

A screw capable of drilling holes easily and discharging dregs effectively includes a head; and a stem. The head is formed by an upper portion and a lower portion. The upper portion is a round disk. The annular ring of the round disk of the head is formed with a plurality of inclined protrusions. Recesses between the protrusions extend from an inner edge of the round ring to an outer edge of the round ring and are arranged along un-radial paths. A periphery of the lower portion of the head is formed with at least one knife sheet which extends from the annular ring of the round disk of the head to the stem; and the direction of the knife sheet is inclined to an axis of the lower portion of the head. At a connection of the head and stem, the knife sheet has a maximum height and width.

6 Claims, 2 Drawing Sheets

COUNTERSINKING SCREW CAPABLE OF EASILY DRILLING HOLES AND DREGS REMOVING

This is a continuation in part (CIP) of U.S. patent application Ser. No. 14/014,335 which is assigned to the inventor of the present invention, and thus the contents of the U.S. patent application Ser. No. 14/014,335 is incorporated into the present invention as a part of the present invention.

FIELD OF THE INVENTION

The present invention relates to screws, and in particular to a screw capable of easily drilling of holes and with the function of dregs removing.

BACKGROUND OF THE INVENTION

Screws have different features based on the objects to be drilled. These features are aimed at to have preferred drilling speed, high dregs removing rate, and easiness in drilling operation. However, the dregs generated in drilling will be left in the drilling hole, but this residue left in the hole is possible to cause that the object to be drilled cracks. The main reason of such a defect is that the dregs left in the hole will further expand the hole to have a larger size, as a result the object to be drilled cracks. A further reason is that the outer diameter of the screw head is larger than an inner diameter of the hole. Then the screw head is embedded into the hole, it is possible that the hole will crack. It is desired to cut, expand and smooth the hole before embedding the screw head so that the larger screw head can be flatly embedded into the hole with an easy and comfortable operation. Furthermore, no cracking forms and the edge of the hole is smooth.

SUMMARY OF THE INVENTION

The object of the present invention is to provide a screw capable of drilling holes easily and removing dregs effectively, which has the advantages of providing a screw by which the screw head can be easily embedded into the drilling hole with a crack-proof effect; proving a screw by which the drilling hole can be cut and expanded before embedding the screw head for dregs removing so that the screw head can be embedding to the drilling hole smoothly; providing a screw by which the edge of the drilling hole will not expose out.

To achieve above object, the present invention provides a screw capable of drilling holes easily and discharging dregs effectively, comprising: a head (1) formed by an upper portion and a lower portion; and a stem (2) extending from a lower portion of the head; the head and the stem being formed integrally; wherein the upper portion of the head (1) is a round disk (11); and the lower portion of the head (1) extends from a lower side of the round disk (11) to an uppermost end of the stem (2); a lower surface of the round disk (11) is disconnected to the lower portion is formed as an annular ring; wherein the annular ring of the round disk (11) of the head (1) is formed with a plurality of inclined protrusions (12); recesses between the protrusions (12) extend from an inner edge of the round ring to an outer edge of the round ring and are arranged along un-radial paths; and wherein a periphery of the lower portion of the head is formed with at least one knife sheet (3) which extends from the annular ring of the round disk of the head (1) to the stem (2); an upper side of the stem (2) is enlarged to form as an enlarged portion and the knife sheets (3) are extended to the enlarged portion of the stem 2 with a predetermined distance (L); the direction of the knife sheet (3) is inclined to an axis of the lower portion of the head; and the knife sheet (3) is separated from the lower surface of the round disk (2) having the protrusions (12) and thus the at least one knife sheet (3) is independent to the protrusions (12); and the stem (2) is formed with threads (21) which are not at the enlarged portion of the stem (2). Furthermore, at a connection of the head (1) and stem (2), the knife sheet (3) has a height from a sharp edge thereof to the connection of the head (1) and stem (2) is larger than other height of the knife sheet (3); and at the connection of the head (1) and stem (2), the knife sheet (3) has a width is larger than other width of the knife sheet (3).

DETAILED DESCRIPTION OF THE PREFERRED EMBODIMENTS

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figures 1, 2:
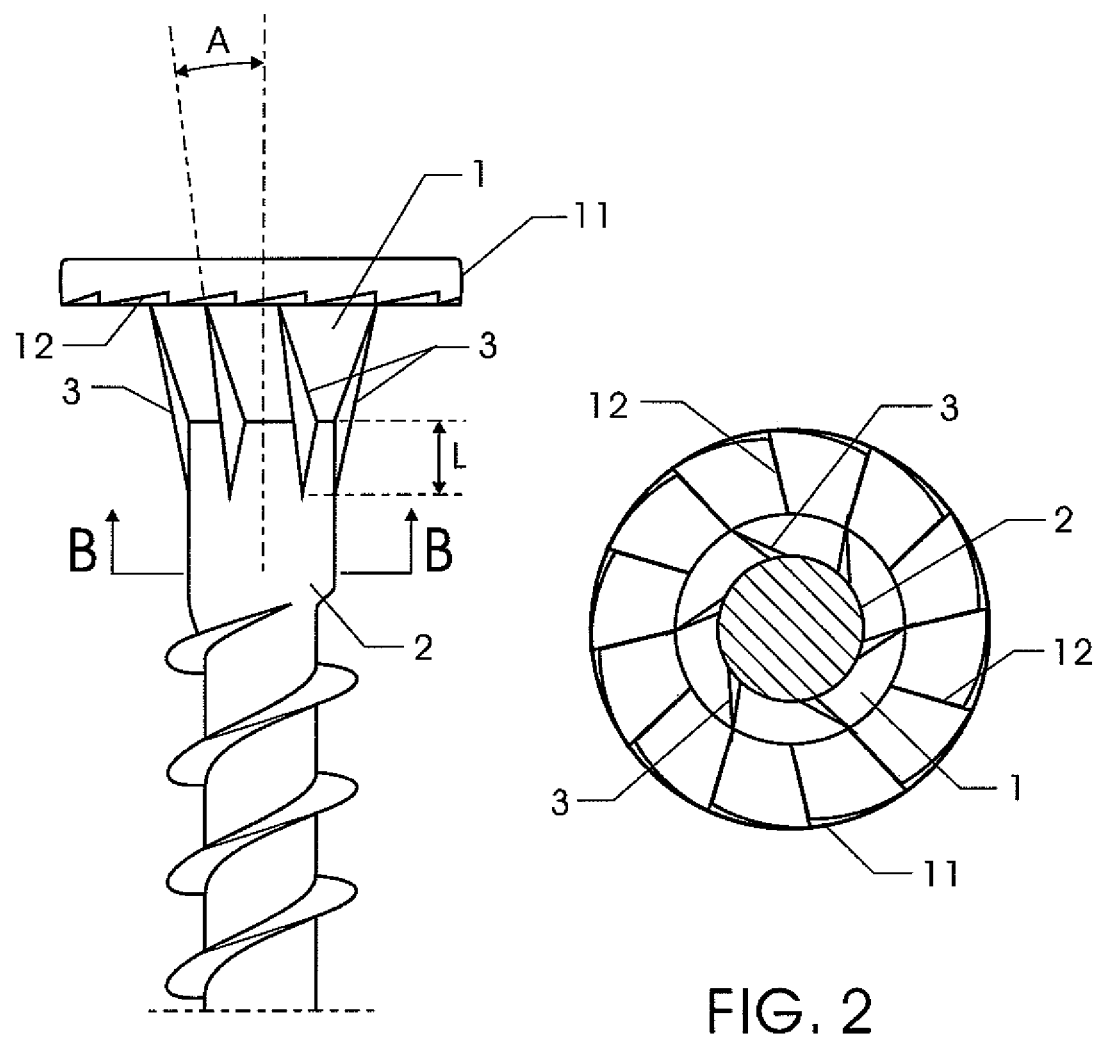
FIG. 1 shows the embodiment of the present invention.
FIG. 2 is a lower side view of the embodiment shown in FIG. 1.

With reference to FIGS. 1 and 2, the structure of the present invention is illustrated.

Referring to FIGS. 1 and 2, the embodiment of the present invention is illustrated, wherein the design of the present invention can be widely used for crack-proof screws and wood screws, and others for drilling holes and dregs removing. With reference to FIGS. 3 to 20, it is illustrated that the present invention can be widely used in trumpet form screws, tapered screws or post form screws. The details of these screws will be described hereinafter.

With reference to FIGS. 1 and 2, the screw of the present invention includes a head 1 and a stem 2 which is formed integrally.

Figures 3, 4:
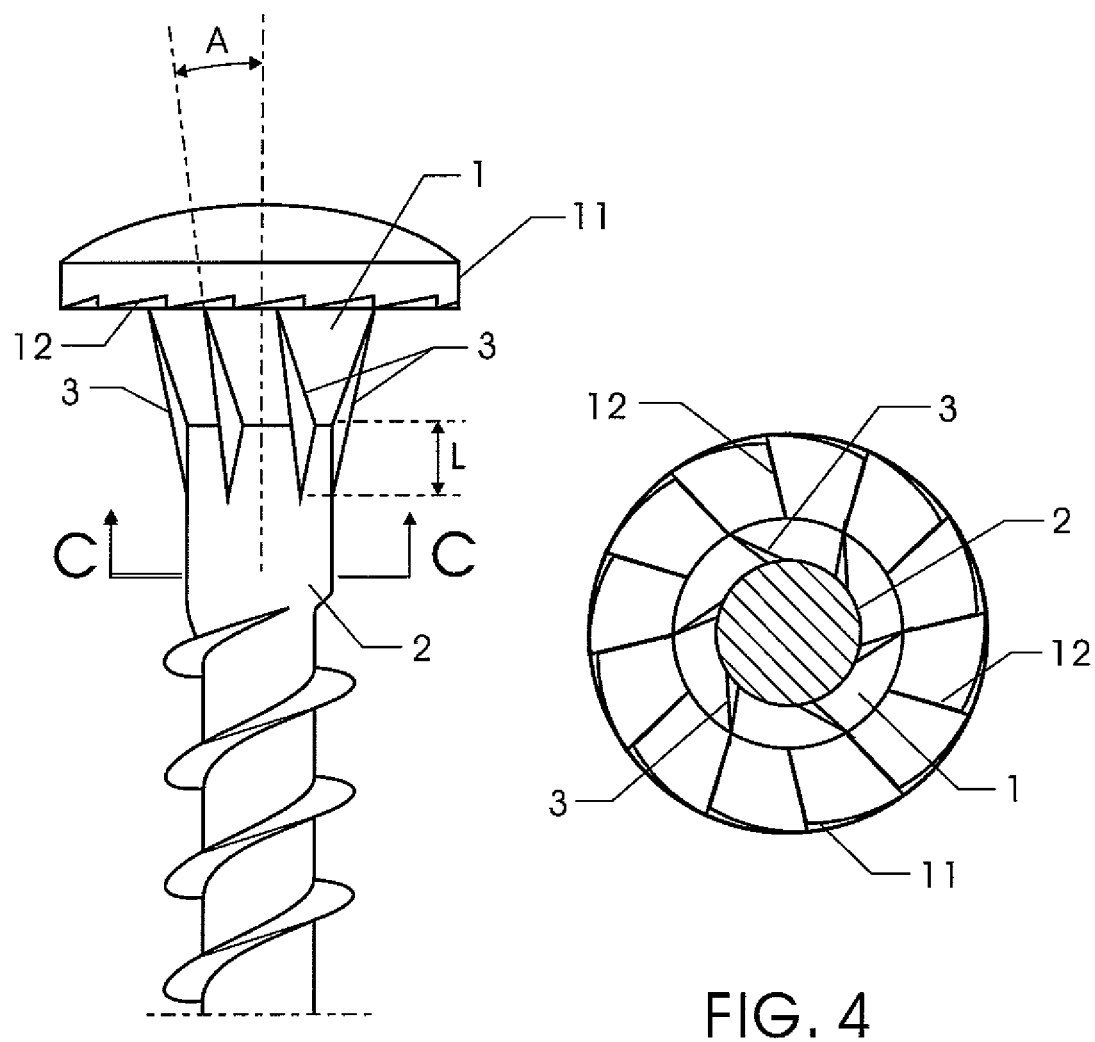
FIG. 3 shows another embodiment of the present invention.
FIG. 4 is a lower side view of the embodiment shown in FIG. 3.

A lower portion of the head 1 has a round tapered shape and is connected to the stem 2 at the lowermost end thereof. An upper portion of the round tapered head 1 is formed as a flat round disk 11. A lower side of the round disk 11 is connected to an upper end of the lower tapered portion of the head 1. A lower side of the round disk unconnected to the tapered portion is formed as an annular ring as illustrated in FIGS. 2 and 4.

The annular ring of the round disk 11 of the head 1 is formed with a plurality of inclined protrusion 12. The recesses between the protrusions 12 are arranged along un-radial paths. These recesses may be straight lines (referring to FIG. 2).

A periphery of the lower tapered portion of the head 1 is formed with at least one knife sheets 3 which extended from the annular ring of the round disk 11 of the head 1 to the stem 2. An upper side of the stem 2 is enlarged to form as an enlarged portion and the knife sheets 3 are extended to the enlarged portion of the stem 2. Furthermore, as illustrated in FIGS. 2 and 4, a lower side of each knife sheet (3) near the head (1) is wider than an upper side thereof near the stem (2). Therefore initially, the screw of the present invention has a large drilling force as it drills an object (not shown).

Furthermore, the knife sheets 3 are extended to a distance L of the enlarged portion of the stem 2. The direction of the knife sheet 3 is inclined to the axis of the lower tapered portion of the head 1. The knife edge of the knife sheet 3 are straight. Two sides of the knife edge of the knife sheet 3 may be formed as cut planes. The direction of the knife edges of the knife sheet 3 can be non-radial, or radial.

The knife sheet 3 is separated from the lower surface of the round disk 2 having the protrusions 12 and thus the at least one knife sheet 3 is independent to the protrusions 12.

The stem 2 is formed with threads 21 and winding direction of the threads 21 is opposite to that of the at least one knife sheet 3 on the lower portion of the head 1 and the protrusions 12 on the lower surface of the round disk 11 of the head 1; when the threads 21 winds clockwise along the stem 2, the knife sheet 3 winds around the lower portion of the head 1 along a counterclockwise path along the lower portion of the head and also the protrusions 12 winds around the lower surface of the round disk 11 of the head 1 along a counterclockwise path; and vice versa.

At a connection of the head 1 and stem 2, the knife sheet 3 has a height from a sharp edge thereof to the connection of the head 1 and stem 2 is larger than other height of the knife sheet 3. Similarly, at the connection of the head 1 and stem 2, the knife sheet 3 has a width is larger than other width of the knife sheet 3.

Referring to FIGS. 1 and 4, it is illustrated that there are six knife sheets 3 which are equal spaced one a surface of the heat land an angle A (see FIG. 1) between an inclination of the knife sheet A and an axis of the head 2 is 25 degrees. Form experimental result, this angle has an optimum effect in drilling an object.

With reference to FIGS. 2 and 4, a lower surface of each protrusion of the annular ring of the head 1 is parallel to the upper surface of the round disk 11. The recesses between the protrusions 12 of the annular ring of the head 1 are not radially arranged and are straight; and the knife edges of the knife sheets 3 are not radially arranged. That is, the knife edge has an inclined angle A with respect to the axis of the lower tapered portion of the head 1. Referring to FIGS. 2 and 4, the protrusions 12 of the annular ring of the head 1 is parallel to the upper surface of the round disk 11.

In FIGS. 1 and 3, the annular ring has a teethed surface.

By above mentioned structure of the present invention, when the screw drills into an object, the outer diameter of the head 1 is greater than that of the stem 2, and the dregs generated in drilling will hinder the drilling operation of the screw. The knife sheets 3 of the present invention has the effect of cutting and expanding the drilling hole further so that dregs can be discharged effectively and thus the screw can drill into the object easily. The protrusions 12 at the annular ring of the head 1 have the effect of preventing the expose of the dregs and presenting a flat outer look.

The present invention is thus described, However, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A screw capable of drilling holes easily and discharging dregs effectively, comprising: a head (1) formed by an upper portion and a lower portion; and a stem (2) extending from the lower portion of the head; the head and the stem being formed integrally; wherein the upper portion of the head (1) is a round disk (11); and the lower portion of the head (1) extends from a lower side of the round disk (11) to an uppermost end of the stem (2); a lower surface of the round disk (11) adjacent to the lower portion is formed as an annular ring; wherein the annular ring of the round disk (11) of the head (1) is formed with a plurality of inclined protrusions (12); recesses between the protrusions (12) extend from an inner edge of the round ring to an outer edge of the round ring and are arranged along non-radial paths; and wherein a periphery of the lower portion of the head is formed with at least one knife sheet (3) which extends from the annular ring of the round disk of the head (1) to the stem (2); an upper side of the stem (2) is formed as an enlarged portion and the knife sheet (3) is extended to the enlarged portion of the stem (2) with a predetermined distance (L); the direction of the knife sheet (3) is inclined to an axis of the lower portion of the head; and the knife sheet (3) extends from the lower surface of the round disk (11) having the protrusions (12) and thus the at least one knife sheet (3) is independent of the protrusions (12); the stem (2) is formed with threads (21) which are not at the enlarged portion of the stem (2); and at a connection of the head (1) and stem (2), the knife sheet (3) has a height from a sharp edge thereof to the connection of the head (1), and the stem (2) is larger than other height of the knife sheet (3); and at the connection of the head (1) and stem (2), the knife sheet (3) has a width that is larger than other width of the knife sheet (3).

2. The screw as claimed in claim 1, wherein a winding direction of the threads (21) is opposite to that of the at least one knife sheet (3) on the lower portion of the head (1) and the protrusions (12) on the lower surface of the round disk (11) of the head (1); when the threads (21) winds clockwise along the stem (2), the knife sheet (3) winds around the lower portion of the head (1) along a counterclockwise path along the lower portion of the head and also the protrusions (12) winds around the lower surface of the round disk (11) of the head (1) along a counterclockwise path; and vice versa.

3. The screw as claimed in claim 1, wherein there are six knife sheet (3) which are equal spaced at a surface of the heat (1) and an angle (A) between an inclination of the knife sheet (A) and an axis of the head (1) is 25 degrees.

4. The screw as claimed in claim 1, wherein a lower side of the knife sheet (3) is wider than an upper side of the knife sheet.

5. The screw as claimed in claim 1, wherein the at least one knife sheet (3) is straight.

6. The screw as claimed in claim 1, wherein the protrusions are straight.

* * * * *